United States Patent [19]

Forehand et al.

[11] 4,354,738

[45] Oct. 19, 1982

[54] FRONT PROJECTION SCREEN WITH PRECISION GAIN CONTROL

[75] Inventors: Frederic N. Forehand, Apalachin; Richard A. Mecklenborg, Binghamton, both of N.Y.

[73] Assignee: The Singer Company, Binghamton, N.Y.

[21] Appl. No.: 246,825

[22] Filed: Mar. 23, 1981

[51] Int. Cl.³ ............................................ G03B 21/60
[52] U.S. Cl. .................................................. 350/126
[58] Field of Search ............................. 350/117, 126

[56] References Cited

U.S. PATENT DOCUMENTS

| | | | |
|---|---|---|---|
| 3,507,548 | 4/1970 | Hoffmann et al. | 350/117 |
| 3,612,650 | 10/1971 | Miyano et al. | 350/126 |
| 3,653,740 | 4/1972 | Ogura et al. | 350/117 |
| 3,726,583 | 4/1973 | Fujisaki et al. | 350/126 |
| 4,025,160 | 5/1977 | Martinez | 350/117 |
| 4,068,922 | 1/1978 | Dotsko | 350/126 |
| 4,201,449 | 5/1980 | Campion et al. | 350/117 |
| 4,206,969 | 6/1980 | Cobb et al. | 350/126 |

Primary Examiner—Richard A. Wintercorn
Attorney, Agent, or Firm—Jeff Rothenberg; Stephen C. Kaufman

[57] ABSTRACT

A front projection screen includes a substrate backing member (12), a primer (14) sprayed on the substrate, a metallic silver mixture (16) adjacent to the primer, and a mist flake mixture (20) adjacent to the mixture (16). The mixture (16) includes a combination of lacquer binder (17), mixing color agent (18) and flattening agent (19); the mist flake mixture (20) includes a combination of silver powder flakes (23) and lacquer binder (17). By selectively changing and controlling the ratios of the components of the metallic silver mixture (16) and the mist flake mixture (20), the screen's peak gain and peak gain fall off can be controlled to produce screens exhibiting a selective, high peak gain, or a constant gain independent of the viewing angle, or a gradient gain.

16 Claims, 9 Drawing Figures

TABLE I

| METALLIC SILVER MIXTURE | 50% LAC. BINDER 50% MIX. COLOR 3% FLAT. AGENT | PHOTO-METER READING | GAIN |
|---|---|---|---|
| VIEWING ANGLE ° | 0° | 231 | 6.8 |
| | 5° | 163 | 4.94 |
| | 10° | 103 | 3.23 |
| | 15° | 71 | 2.08 |
| | 20° | 45 | 1.32 |
| | 25° | 31 | .91 |
| | 30° | 22 | .64 |
| | 35° | 17 | .50 |
| | 40° | 13 | .38 |
| | 45° | 11 | .32 |
| | 50° | 09 | .26 |
| | 55° | 08 | .23 |
| | 60° | 07 | .21 |

FIG. 6 (CURVE ①)

| METALLIC SILVER MIXTURE | 60% LAC. BINDER 40% MIX. COLOR 10% FLAT. AGENT | PHOTO-METER READING | GAIN |
|---|---|---|---|
| VIEWING ANGLE ° | 0° | 55 | 1.47 |
| | 5° | 49 | 1.44 |
| | 10° | 46 | 1.35 |
| | 15° | 42 | 1.24 |
| | 20° | 37 | 1.08 |
| | 25° | 33 | .97 |
| | 30° | 29 | .85 |
| | 35° | 25 | .74 |
| | 40° | 22 | .65 |
| | 45° | 19 | .55 |
| | 50° | 17 | .50 |
| | 55° | 15 | .44 |
| | 60° | 13 | .38 |

FIG. 6 (CURVE ②)

TABLE I CONT.

| METALLIC SILVER MIXTURE | 60% LAC. BINDER 40% MIX. COLOR 0% FLAT. AGENT | PHOTO- METER READING | GAIN |
|---|---|---|---|
| VIEWING ANGLE ° | 0° | 364 | 10.7 |
| | 5° | 161 | 4.73 |
| | 10° | 88 | 2.5 |
| | 15° | 60 | 1.76 |
| | 20° | 43 | 1.26 |
| | 25° | 30 | .88 |
| | 30° | 22 | .64 |
| | 35° | 18 | .53 |
| | 40° | 14 | .41 |
| | 45° | 12 | .35 |
| | 50° | 11 | .32 |
| | 55° | 09 | .26 |
| | 60° | 09 | .26 |

FIG. 6 (CURVE ③)

| METALLIC SILVER MIXTURE | 25% LAC. BINDER 75% MIX. COLOR 0% FLAT. AGENT | PHOTO- METER READING | GAIN |
|---|---|---|---|
| VIEWING ANGLE ° | 0° | 308 | 9.06 |
| | 5° | 193 | 5.68 |
| | 10° | 100 | 2.94 |
| | 15° | 71 | 2.08 |
| | 20° | 49 | 1.44 |
| | 25° | 36 | 1.05 |
| | 30° | 27 | .79 |
| | 35° | 21 | .61 |
| | 40° | 17 | .50 |
| | 45° | 14 | .41 |
| | 50° | 13 | .38 |
| | 55° | 12 | .35 |
| | 60° | 11 | .32 |

FIG. 6 (CURVE ④)

FIG. 7

TABLE II

| VIEWING ANGLE° | METALLIC SILVER MIXTURE 50% LAC. BINDER 50% MIX. COLOR 5% FLAT. AGENT | MIST FLAKE MIXTURE SILVER POWDER FLAKES + LAC. BINDER | | PHOTOMETER READING | GAIN | GAIN NORMALIZED | FIG. 4 |
|---|---|---|---|---|---|---|---|
| 0°<br>6°<br>12° | → | — | — | 250<br>173<br>99 | 6.58<br>5.24<br>3.54 | 100<br>80<br>54 | CURVE 1 |
| 0°<br>6°<br>12° | → | 1 COAT | 1 COAT | 197<br>162<br>111 | 4.48<br>4.26<br>3.08 | 100<br>95<br>69 | CURVE 2 |
| 0°<br>6°<br>12° | → | — | 2 COATS | 137<br>107<br>77 | 4.15<br>3.57<br>2.66 | 100<br>86<br>64 | CURVE 3 |
| 0°<br>6°<br>12° | → | 1 COAT | 2 COATS | 85<br>67<br>50 | 3.00<br>2.90<br>2.17 | 100<br>97<br>72 | CURVE 4 |
| 0°<br>6°<br>12° | → | 2 COATS | 2 COATS | 105<br>92<br>72 | 2.76<br>2.63<br>2.18 | 100<br>95<br>79 | CURVE 5 |

FRONT PROJECTION SCREEN WITH PRECISION GAIN CONTROL

TECHNICAL FIELD

This invention relates to projection screens and more particularly, to a front projection screen with precision gain control for use in visual display systems.

BACKGROUND ART

When a projector and an observer of a projected image are located on the same side of a projection screen, the screen is commonly referred to as a front projection screen. Front projection screens typically include a support structure or substrate plus some overlaying coating which comprises a screen surface. The present invention is directed to features of the screen surface.

In a typical visual display system, the front projection screen, the projector, and the observer are positioned at different locations. This displacement of the observer's eye position from the location of the projector produces a condition referred to as off-axis viewing.

As discussed in U.S. patent application, Ser. No. 191,968 entitled Variable Gain Screen Permitting Off-Axis Viewing With Image Brightness Remaining Constant, by Dotsko et al., filed on Sept. 29, 1980, and assigned to the same assignee as the present invention, off-axis viewing causes the luminence or image brightness of the screen, as perceived by the observer, to change in correspondence with any change in viewing angle defined by the observer's eye line-of-sight. This Dotsko disclosure is incorporated by reference herein for a thorough exposition of the concepts just set forth.

The dependency of the perceived luminence of a screen, as a function of viewing angle, may be measured quantitatively and graphed. Perceived luminence is quantified by measuring the gain of the screen: the peak gain is defined as the measure of luminence or image brightness of the screen surface measured along a normal to the surface.

Figure 1:
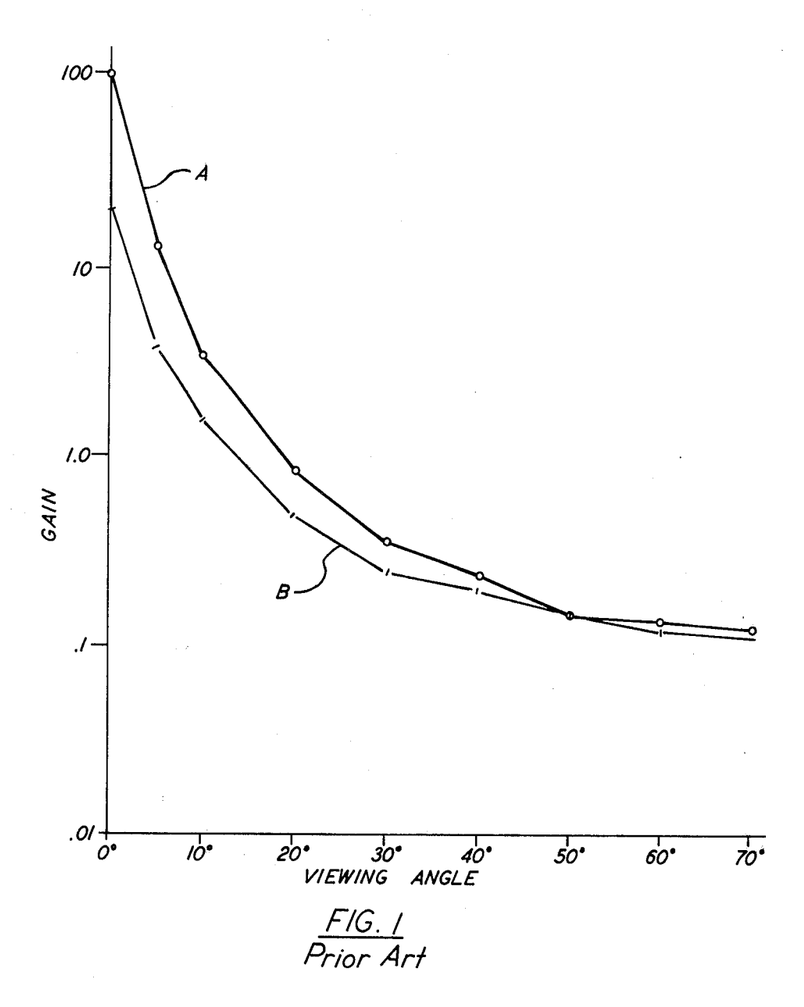
FIG. 1 is a graph of gain versus viewing angle for typical prior art screen surfaces.

FIG. 1 shows a typical graph of gain versus viewing angle. In this figure, Curve A shows the relative luminence for a projection screen that uses a bright aluminum metal substrate coated with a lacquer film; Curve B shows a dull aluminum metal substrate coated with a lacquer film. These projection screens are described in further detail in U.S. Pat. No. 4,068,922 entitled "Front Projection Screen" which issued Jan. 17, 1978 to M. Dotsko.

It is observed in FIG. 1 that the peak gain quite rapidly "falls off" to a reduced "off-axis" gain as the viewing angle increases from zero degrees (where the gain is measured along the normal) to 90°. For example, in Curve A, the gain is 100 at the normal but falls off to 10 to approximately 8° off-axis. It is desirable, however, to have a screen surface that exhibits very slow gain fall off as the viewing angle increases, as this will provide the observer with constant image brightness for the whole screen surface.

The prior art has not adequately addressed the problem of rapid gain fall off as a function of viewing angle. For example, the above cited Dotsko application works around this problem by providing a screen surface that has a plurality of screen surface portions, each with a different peak gain. The peak gain varies from one surface portion to the next in such a manner as to compensate for the very rapid gain fall off of each individual surface portion. In this way, the Dotsko application provides an off-axis observer with a perceived image brightness which is constant, independent of changes in the viewing angle.

The present invention addresses the problem of rapid gain fall off as a function of viewing angle in a fundamentally different manner. Here, the emphasis is on re-examining the selection and combination of screen surface coatings so as to provide a front projection screen that exhibits very slow gain fall off as the viewing angle increases. The present invention takes advantage of the diffusing characteristics of a metallic, silver flake coating material, properly combined with a bonding material, to produce a front projection screen that provides the observer with constant image brightness over the whole screen surface.

DISCLOSURE OF THE INVENTION

Accordingly, a primary object of the present invention is to provide a front projection screen that exhibits a selective peak gain that is independent of the viewing angle.

Another object is to construct such a screen which permits precise control of the screen gain.

Another object is to construct a high gain, front projection screen that provides constant image brightness in a visual system that has off-axis viewing.

A further object is to provide a front projection screen characterized by high resolution and amenable to simple, repeatable fabrication.

In accordance with the present invention, a screen surface for use on a substrate to provide a front projection screen having a selected peak gain comprises a liquid metallic silver mixture. This mixture includes a lacquer binder component, a mixing color agent component, and a flattening agent component.

In further accordance with the present invention, a screen surface for use on a substrate to provide a front projection screen comprises a liquid metallic silver mixture. The liquid metallic silver mixture includes a lacquer binder component, a mixing color agent component, and a flattening agent component. Also, the screen surface includes a mist flake mixture applied to the liquid metallic silver mixture. The mist flake mixture includes a silver powder component and a lacquer binder component.

BRIEF DESCRIPTION OF DRAWINGS

These and other features of the present invention will be more clearly understood from a consideration of the following description taken in connection with the accompanying diagrams in which.

BEST MODE FOR CARRYING OUT THE INVENTION

Figure 2A:
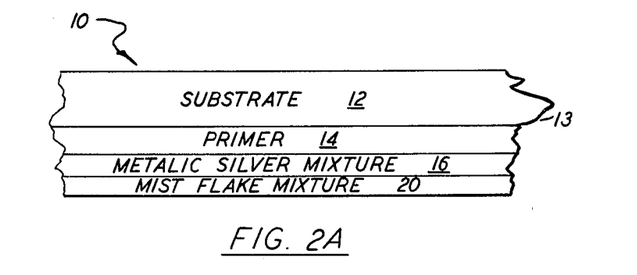
FIGS. 2A, 2B, 2C are schematics showing a front projection screen constructed according to the principles of the present invention.

A front projection screen 10, constructed according to the principles of the present invention, is depicted in cross-sectional view in FIG. 2A. For the sake of clarity, this screen is shown greatly magnified but not to scale. Projection screen 10 includes the following components: a substrate backing member 12, a primer 14 sprayed on the substrate, a metallic silver mixture 16 adjacent to the primer 14, and a mist flake mixture 20 adjacent to the metallic silver mixture 16. These components may be appropriately combined and proportioned to construct at least three different types of screens: a selective, high peak gain screen, a constant gain screen, and a gradient gain screen. These different type screens will be discussed after the properties of the individual components are examined in detail.

The substrate backing member 12 may include any material that can be painted. For example, the substrate may be steel, sheet metal, fiberglass, or wood. In the preferred embodiment, the substrate comprises aluminum sheet. This sheet can be flat or curved and should have a smooth surface.

The primer 14 is applied to the front surface 13 of substrate backing member 12. The primer 14 is sprayed on surface 13 in accordance with conventional priming techniques in order to smooth and fill the substrate front surface. It has been found that a uniform buildup of three or more coats of primer is desirable for providing a basis from which to achieve precise control of the screen gain. A suitable primer for this application is Dupont Lucite 30S Platinum Gray Primer. It is desirable to use a conventional paint spraying gun which assures that the primer coats are of uniform thickness and that the process is repeatable.

As described above, a metallic silver mixture 16 is applied to the primer 14 using conventional painting techniques. The mixture 16 comprises a plurality of spray coats of liquid metallic silver. It has been determined that it is optimal to apply a minimum of four coats in order to obtain a uniform surface and in order to control the peak gain magnitude of the screen. The exact manner in which the peak gain is thus controlled will be set forth below, after the individual components of the metallic silver mixture 16 are described in detail.

Figure 2B:
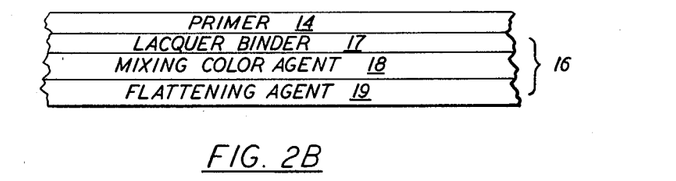

In the preferred embodiment (FIG. 2B), the metallic silver mixture 16 includes a mixture of lacquer binder 17, mixing color agent 18, and flattening agent 19. The lacquer binder 17 is preferably a clear lacquer solution that binds and suspends the mixing color agent 18 to the substrate front surface 13. A suitable binder for this purpose is Dupont Lucite 465L Lacquer Binder. The binder 17 is mixed with a mixing color agent 18, which in the preferred embodiment is bright silver. The bright silver mixing color is available from Dupont Lucite (442L Lacquer Mixing Color). The mixing color agent 18 is combined with the lacquer binder 17 and the flattening agent 19, which functions to "flatten" or reduce the high gain, glossy property of the lacquer binder 17. A suitable flattening agent for this purpose is Dupont Lucite 4528 Flattening Agent.

Figure 6:
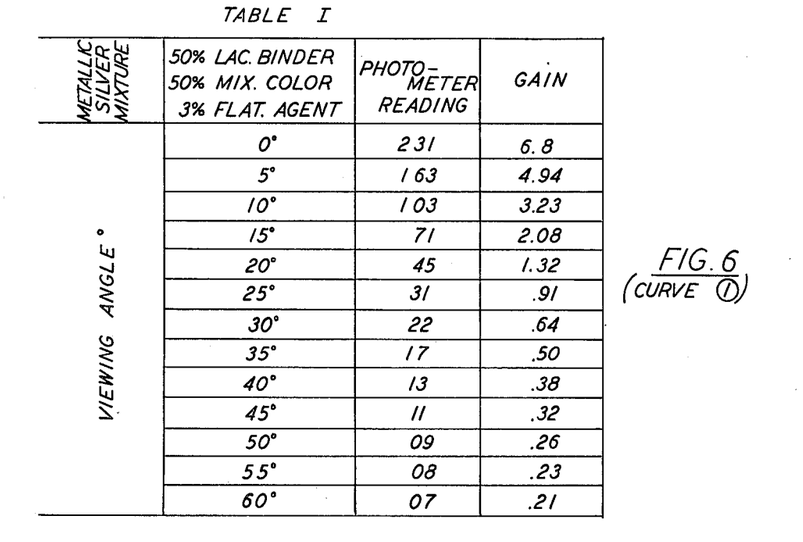
FIG. 6 is a table containing data used to construct screens having a selected peak gain.

The metallic silver mixture 16 in combination with the primer 14 controls the peak gain of the screen 10 and thereby provides a selective, high peak gain screen. Table I (FIG. 6) shows that, by suitably adjusting the ratios of the components of the metallic silver mixture 16, any desired peak gain screen may be constructed. Table I shows four different sets of data, each of which sets forth combinations or ratios of metallic silver mixture components. Using the first set of data, as an example, it is observed that the ratio includes a mixture of 50% lacquer binder, 50% mixing color and 3% flattening agent (where the percentages represent the relative ratios of the components in the mixture). With this ratio, measurements of screen luminence are taken by using a standard 300 watt projection lamp and a Pritchard Photometer. From a distance of approximately 14 feet from the screen 10, the luminance is measured over a wide range of viewing angles. At 0° (the measurement along the normal), the peak gain is 6.8 based on a photometer reading of 231 (and compared to a standard diffuser, carbonate of magnesia). At 5°, the peak gain falls off to 4.94 based on a photometer reading of 168. Further measurements in 5° increments up to 60° are set forth in Table I. The remaining three sets of data which comprise Table I may be analyzed analogously to this example.

Figure 3:
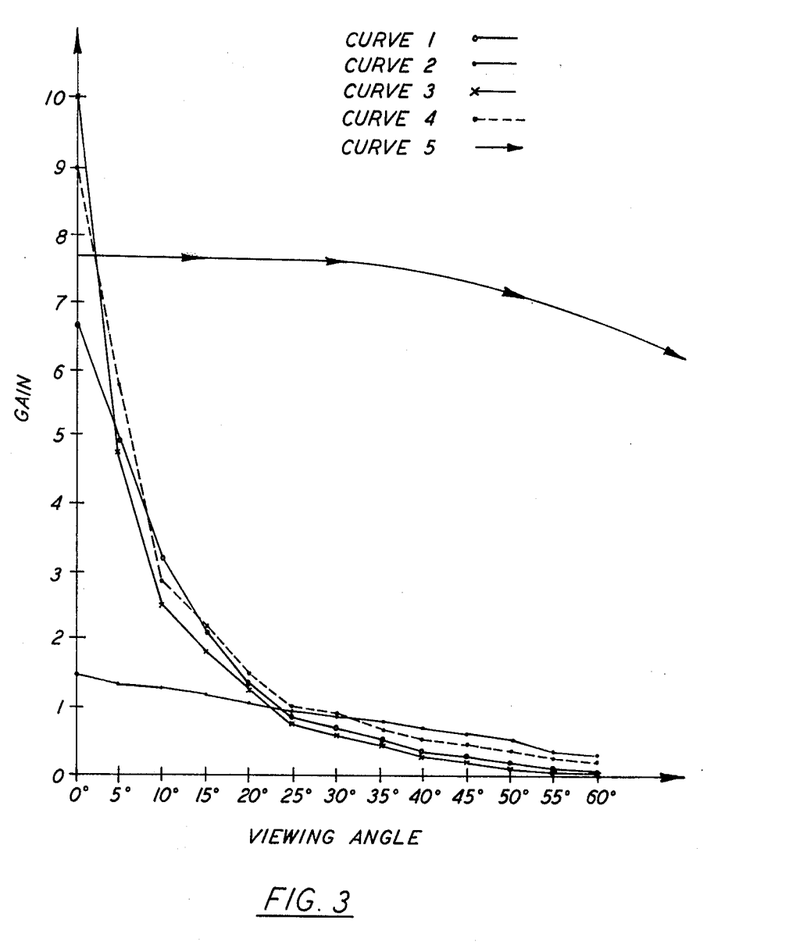
FIG. 3 is a series of curves of gain versus viewing angle, constructed from data in Table I.

The measurements for all four sets of data are plotted in graph form in FIG. 3, which shows the gain magnitudes as a function of viewing angle. The principles of the present invention as described above can be employed to construct any desired peak gain screen. However, it is observed from FIG. 3 that the fall off from peak gain magnitude is very fast for curves 1 through 4. The principles of the present invention are now expanded in order to show how the gain curves of FIG. 3 can be controlled to produce a slow gain fall off and thereby a constant gain screen. This goal is illustrated by curve 5 in FIG. 3, which is an idealized curve that shows slow gain fall off.

Figure 2C:
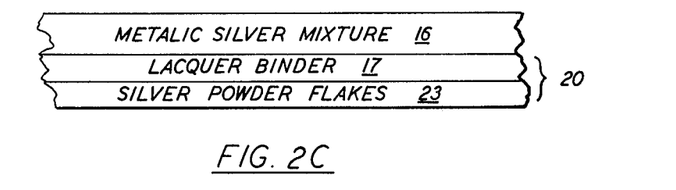

Controlled gain fall off is achieved by applying a mist flake mixture 22 adjacent to the liquid metallic silver mixture 16 described above. In the preferred embodiment (FIG. 2C), the mist flake mixture 20 includes a variable mixture of silver powder flakes 23 and a lacquer binder, such as lacquer binder 17. The key component in the mist flake mixture 20 is the silver powder flakes 23. This component is preferably an aluminum powder, and is readily available from Ditzler Automotive Finishes, Detroit, Mich. 48235, as product DX 204 Radiance Silver Powder.

In the preferred embodiment of the present invention, the mist flake mixture 20 is sprayed as a light mist, one coat at a time, over a metallic silver mixture 16 that has a fixed ratio of components 17, 18 and 19. The ratio of silver powder flakes 23 to lacquer binder 17 is controlled, and so is the number of spray coats of mixture 20, thereby controlling the peak gain fall off and simulating the slow gain fall off curve 5 shown in FIG. 3. The introduction of the silver powder flakes 23 to the mixture 16 acts to diffuse or scatter the incident light flux on the screen 10. This process of diffusing or scattering the incident light flux acts to reduce the peak gain magnitude, at the same time that it flattens the gain curve over a wide range of angles.

Figure 7:
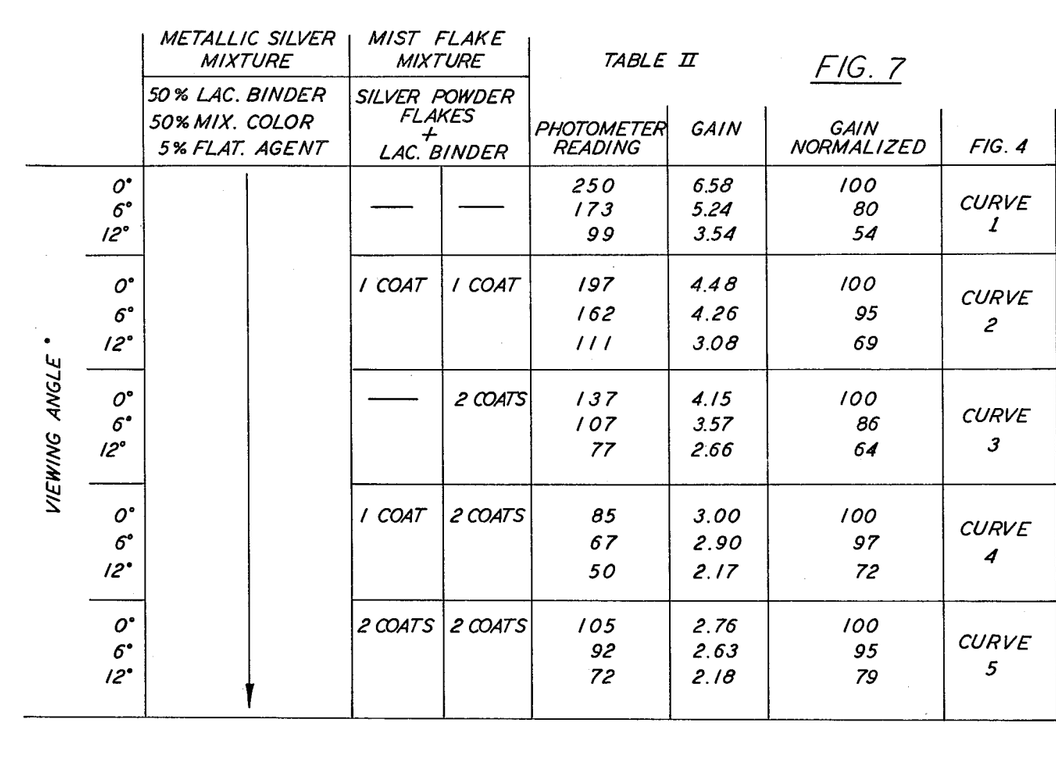
FIG. 7 is a table containing data used to construct screens having constant gain.

Table II (FIG. 7) illustrates this process for the case where the fixed ratio of metallic silver mixture 16 includes 50% lacquer binder, 50% mixing color and 5% flattening agent. Table II further shows controlled amounts of mist flake mixture 20 added to the metallic silver mixture 16 to produce a controlled peak gain fall off. For example, Table II shows a one coat 50% lacquer binder, 50% silver powder flake mixture added to this metallic silver mixture.

Figure 4:
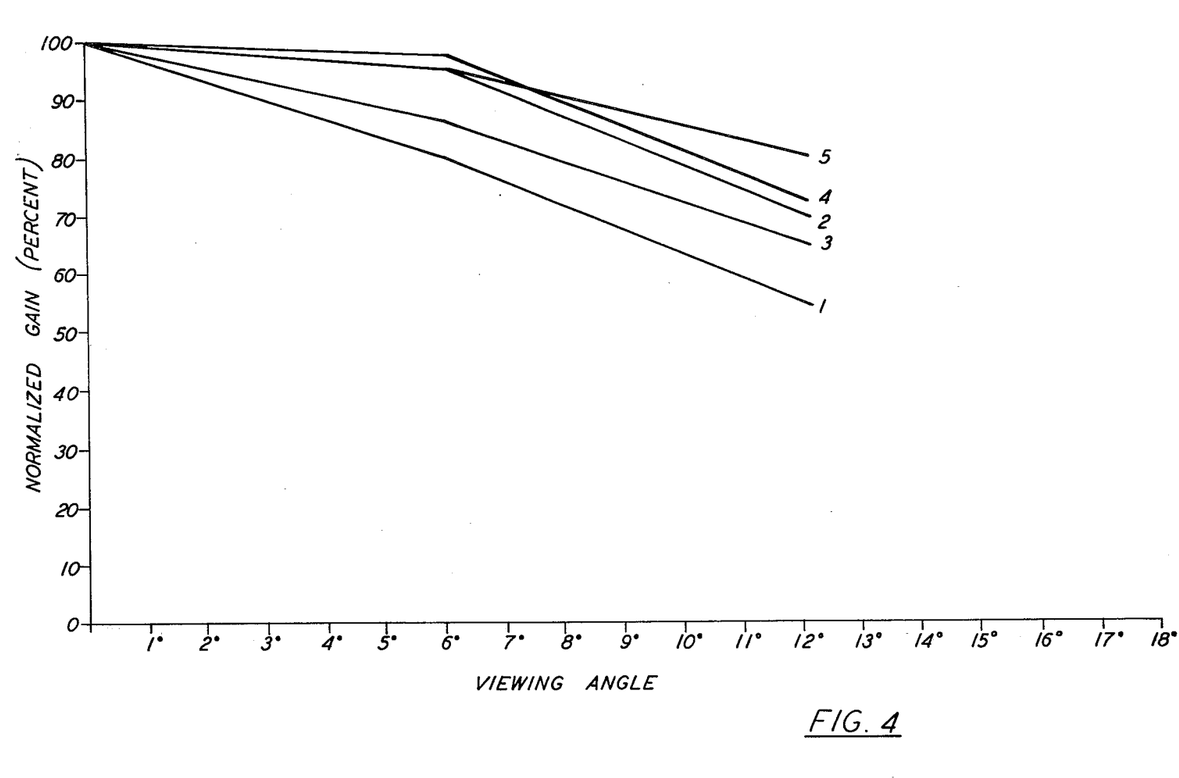
FIG. 4 is a series of curves of normalized gain versus viewing angle, derived from data in Table II.

A quantitative demonstration of the degree of control over the peak gain fall off is provided by normalizing the gain measurements. This is shown in FIG. 4 which shows normalized gain magnitudes as a function of viewing angle. Gain curves 1 through 5 are plotted from the data set forth in Table II. FIG. 4 shows, for example, that gain curve four remains at 100% of the peak gain 3.0 magnitude up to 6° away from the normal, and falls to 83% of the peak gain 3.0 magnitude at 12° away from the normal. The data in Table II, as shown in graph form in FIG. 4, illustrates that the principles of the present invention include the control of the ratio of mist flake mixture 20 components to flatten out the gain curve of a front projection screen.

Figure 5:
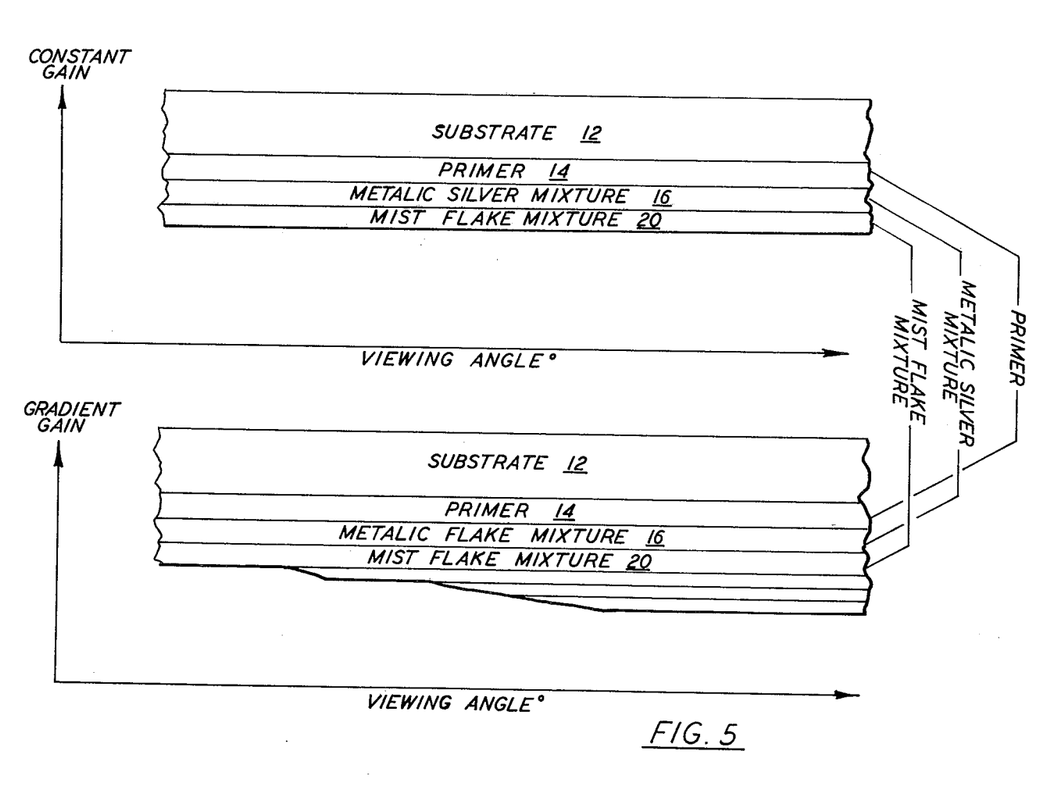
FIG. 5 is a schematic showing a gradient gain curve generated according to the principles of the present invention.

In an alternative embodiment of the present invention, shown in FIG. 5, the ratios of the components of the metallic silver mixture 16 and the ratios of the components of the mist flake mixture 20 are simultaneously made variable and controlled to produce a gradient gain curve and thereby a gradient gain screen. By suitably controlling all of the indicated ratios, the present invention enables one to select a peak gain magnitude and slowly lower the gain fall off as the viewing angle increases. This feature is particularly desirable if the light flux output from many different projectors is variable and it is important to compensate for these variances with a gradient gain screen to provide constant screen lumination.

The present invention, in summary, may be employed to construct at least three different type of front projection screens. These types include the selective, high peak gain screen (FIG. 3), the constant gain screen (FIG. 4), and the gradient gain screen (FIG. 5). It has been determined that conventional painting techniques of thinning, retarding, and drying are important processes for all three types of screens, in order to obtain uniformity of color and surface quality and high image resolution. Dupont Lucite 3608 Acrylic Lacquer Thinner and Dupont Lucite Lacquer Retarder, in a 50%/50% mixture, are particularly suitable for this purpose.

Although specific embodiments of the present invention have been described herein, it will be obvious to those skilled in the art that various modifications may be made without departing from the spirit of the invention. With the foregoing in mind, it is understood that the invention is intended to be limited solely by the appended claims.

We claim:

1. A screen surface for use on a substrate for providing a front projection screen of selective peak gain, comprising:
    (a) a liquid metallic silver mixture comprising a lacquer binder component, a mixing color agent component, and a flattening agent component.

2. The screen surface as recited in claim 1, wherein the ratios of said components within said mixture are selectively controlled in accordance with a desired peak gain magnitude.

3. A screen surface for use on a substrate for providing a front projection screen, comprising:
    (a) a liquid metallic silver mixture comprising a lacquer binder component, a mixing color agent component and a flattening agent component; and
    (b) a mist flake mixture overlaying said silver mixture and comprising a silver powder component and a lacquer binder component.

4. The screen surface as recited in claim 3, wherein the ratios of said mist flake mixture components are selectively controlled in accordance with a constant gain magnitude.

5. The screen surface as recited in claim 3, wherein the ratios of said silver mixture components and said mist flake mixture components are selectively controlled to produce a gradient gain screen.

6. The screen surface as recited in claim 4, wherein the screen image brightness is independent of viewing angle.

7. The screen surface as recited in claims 1 or 3, further including a primer in combination with said silver mixture.

8. The screen surface as recited in claim 7, further including a mix of paint thinner and retarder.

9. The screen surface as recited in claim 1, wherein said silver mixture comprises 50% lacquer binder, 50% mixing color agent and 5% flattening agent.

10. A method for constructing a front projection screen comprising the steps of:
    (a) providing a substrate;
    (b) applying a liquid metallic silver mixture to said substrate, said silver mixture comprising a lacquer binder component, a mixing color agent component, and a flattening agent component.

11. The method as recited in claim 10, further comprising the step of selectively controlling the ratio of components in said metallic silver mixture to provide the screen with a desired peak gain.

12. The method as recited in claim 10, further comprising the step of overlaying said silver mixture with a mist flake mixture, said mist flake mixture comprising a silver powder component and a lacquer binder component.

13. The method as recited in claim 12, further comprising the step of selectively controlling the ratio of components in said mist flake mixture to provide the screen with a desired constant gain.

14. The method as recited in claim 13, further comprising the step of controlling the ratio of components in said metallic silver mixture to provide the screen with a gradient gain.

15. The method as recited in claims 10 or 12, further comprising the step of applying a primer to said substrate prior to applying said silver mixture.

16. The method as recited in claim 15, further comprising the step of applying a thinner and retarder to said metallic silver mixture.

* * * * *